F. E. COLLINS.
OIL FILTER.
APPLICATION FILED MAY 19, 1910.

1,001,929.

Patented Aug. 29, 1911.

Fig. 2.

Fig. 1.

WITNESSES
M. P. Williamson
S. M. Gallagher

INVENTOR
Francis E. Collins
BY
W. W. Williamson
ATTORNEY

UNITED STATES PATENT OFFICE.

FRANCIS E. COLLINS, OF CONSHOHOCKEN, PENNSYLVANIA.

OIL-FILTER.

1,001,929.  Specification of Letters Patent.  Patented Aug. 29, 1911.

Application filed May 19, 1910. Serial No. 562,192.

*To all whom it may concern:*

Be it known that I, FRANCIS E. COLLINS, a citizen of the United States, residing at Conshohocken, in the county of Montgomery and State of Pennsylvania, have invented a certain new and useful Improvement in Oil-Filters, of which the following is a specification.

My invention relates to a new and useful improvement in oil filters, and has for its object to provide an exceedingly simple and effective device of this character, whereby the oil may be readily, quickly and thoroughly filtered.

Another object of the invention is to construct the filter that the foreign matter after being excluded from the oil may be blown from the filter by steam.

A further object of the invention is to so arrange the filtering parts as to prevent their displacement when the steam is being used to blow out the foreign matter.

Another object is to provide drains so that the filtered oil may be drawn from the filter before the steam is allowed to enter, and also the oil between the shell and filtering tube drained out.

A still further object of the invention is to provide a pressure gage situated upon the supply pipe so that the operator may know when it is necessary to clean the filter.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 shows two filters made in accordance with my improvement, as they are connected in pairs, one of said filters being shown in section, and Fig. 2, a horizontal sectional view of the filtering tube and its coverings.

In carrying out my invention as here embodied, A represents the filter tank, in which is placed a filtering tube B, having perforations C, and this tube is provided at each end with a head D, through which passes a perforated pipe E, said pipe being situated in the axial center of the filtering tube. Over the filtering tube B is placed a covering of wire gauze F. Around this wire gauze is wrapped a suitable fabric G, which is preferably muslin.

In placing the fabric upon the tube it is wound around and around and drawn very tight until a considerable thickness is obtained, and in order that this may be held securely in place, I wrap a wire H about it. The strands of this wire are wound very close for some distance at the top and bottom, while in between the strands are some distance apart, at about one-half inch pitch.

When the filtering tube and its coverings are in place in the filtering tank, there is still considerable space into which the oil may enter.

Leading to the filtering tank is a pipe I, in which is situated a valve J, and leading to this pipe is a supply pipe K, through which the oil passes from the pumps. Where these two pipes join is connected the gage pipe L, on which is mounted the pressure gage M. As the oil is pumped through the supply pipe K, it passes through the pipe I into the filter tank and is gradually forced into the filtering tube through its coverings, from which place it passes into the perforated tube E into the outlet pipe N to the system pipe O, having a valve Q situated therein.

To the outlet pipe N is connected the steam pipe R which leads from the steam boiler.

The lower end of the perforated pipe E is connected to the drain pipe S, having a valve T, and this drain pipe is connected with the return pipe U, which leads to the receiving tank so that it may be again returned to the pumps. The receiving tank and the pumps are not shown since they do not pertain to my improvement.

V represents a blow off pipe leading from the bottom of the filter tank and from this branch the pipes W and X, each having a valve Y and Z situated therein. The pipe W leads to the receiving tank and if found desirable may be connected with the return pipe U. The pipe X leads to the atmosphere.

In practice while the oil is being filtered the valves J and Q are open, while the valves T and V are closed, this permits the oil to pass through the supply pipe K and pipe I and into the tank A, and because of the pressure, the oil will be forced through the fabric G and wire gauze F into the filtering tube, the foreign matter in the oil remaining upon the outer circumference of the fabric. After the oil has entered the filtering tube it will pass into the perforated pipe E and through the outlet pipe N into the system pipes O.

Should the filter become clogged, that is, the fabric become fully coated with the foreign matter, it will be very difficult for the oil to pass into the filtering tube B, which will cause the pressure to be raised, and this will be indicated upon the pressure gage M, notifying the operator that the filter needs cleaning.

To clean the filter, the valves J and Q are closed and the valve T opened, allowing the filtered oil within the filtering tube to flow through the drain S into the return pipe U, and after this oil has drained off, the valve T is closed and either valve Y or Z opened, it being understood that the valves J and Q remain closed, the steam is then allowed to pass from the boiler through the steam pipe R and the outlet pipe N, into the perforated pipe E, and from there it will enter the filtering tube B, being forced through the perforations C, the wire gauze F and the fabric G, into the interior of the tank A, blowing the foreign matter from the fabric through the blow off pipes V, then to the receiving tank through the pipe W or to the atmosphere through the pipe. After the foreign matter has been blown from the fabric the filter is again ready for operation.

Of course I do not wish to be limited to the exact details of construction here shown, as these may be varied within the limits of the appended claims without departing from the spirit of my invention.

Having thus fully described my invention, what I claim as new and useful is—

1. In an oil filter, the combination with a filtering tank having an inlet and an outlet, of a perforated filter tube having imperforated heads, wire gauze mounted upon the outer circumference of said tube, a fabric wound about said wire gauze, and means for holding said fabric in place.

2. In an oil filter, the combination with a filtering tank having an inlet and an outlet, of a perforated filter tube having imperforated heads, wire gauze mounted upon the outer circumference of said tube, a fabric wound about said wire gauze, a wire wound about the fabric for holding it upon the tube, and a perforated pipe passing through the filtering tube, its ends projecting beyond both heads.

3. In combination, a filtering tank, a valve or blow off cock leading therefrom, a supply pipe leading to said tank, a pressure gage situated therein, a valve also situated in said supply pipe between the pressure gage and tank, a drain pipe leading from the tank, a valve situated therein, a return pipe connected with the drain pipe, an outlet pipe, a system pipe having connection with the outlet, a steam pipe also having connection with said outlet, a perforated filtering tube mounted within the tank, an imperforated head upon each end of said tube, a wire gauze placed about the filtering tube, a fabric wrapped about the wire gauze for a number of thicknesses, a wire placed about said fabric for holding the fabric against displacement, and a perforated pipe passing through the filtering tube, the ends of which project beyond the heads and have connection with the drain and outlet pipes.

4. In an oil filter the combination of a filtering tank, of a perforated filtering tube having imperforated heads, a pipe perforated throughout that portion between the heads of the filtering tube, the ends of said pipe extending beyond the heads of the filtering tube and supporting said filtering tube within the filtering tank so that none of its parts are in contact with said filtering tank, wire gauze lying against the outer surface of said filtering tube, a fabric in contact with said wire gauze, and means for holding the fabric in place.

In testimony whereof, I have hereunto affixed my signature in the presence of two subscribing witnesses.

FRANCIS E. COLLINS.

Witnesses:
 Edw. W. Anstice,
 S. M. Gallagher.